Figure 1:
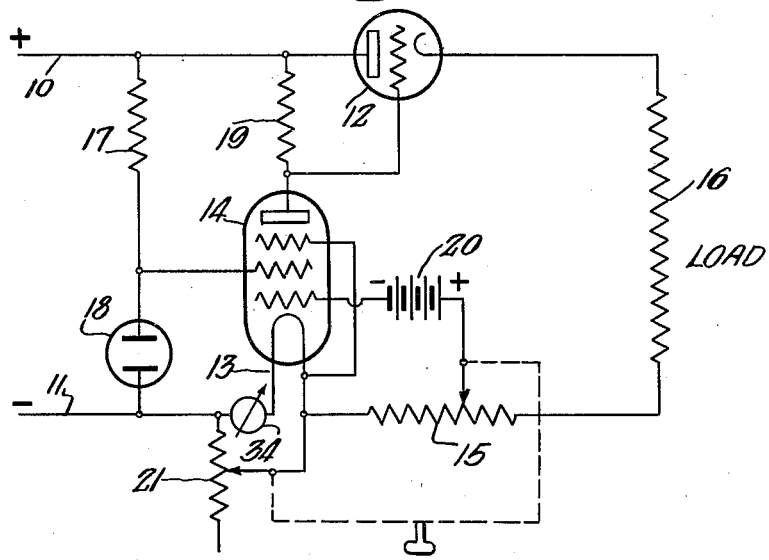

Aug. 6, 1940.  R. A. BRADEN  2,210,394
REGULATING SYSTEM
Filed May 28, 1938

Inventor
Rene A. Braden
By
Attorney

Patented Aug. 6, 1940

2,210,394

UNITED STATES PATENT OFFICE 2,210,394

REGULATING SYSTEM

Rene A. Braden, Collingswood, N. J., assignor to Radio Corporation of America, a corporation of Delaware Application May 28, 1938, Serial No. 210,593

4 Claims. (Cl. 171—312)

This invention relates to regulating systems such as are utilized to regulate the voltage or current of an electrical load circuit, and has for its principal object the provision of an improved regulating system and method of operation whereby the regulated characteristic is rendered independent of variation in the cathode heating of the electron discharge device which is controlled by the current flowing through the load circuit.

In the form of regulating circuit in which the voltage at the plate of an electron discharge device is controlled by the current flowing through the load, and the plate voltage of the control device is amplified and applied to the grid of a regulating device which is so connected that the current flowing to the load passes through its cathode-anode current, difficulty is frequently encountered due to the fact that variations in the cathode-heating current of the control device tend to produce similar variations in the current flowing through the regulating device and the load.

It has been proposed to avoid this difficulty by the provision of means for regulating the cathode heating current of the control device but such means are necessarily somewhat expensive and involve various complications of the system.

In accordance with the present invention, the effect of variation in the control device cathode heating current on the load current is avoided by an improved system wherein the load current is utilized to heat the cathode of the control device from which the control grid potential of the regulating device is derived. Under these conditions, any load current change resulting from variation in the control device cathode heating current operates through the cathode heating circuit of the control device to neutralize the effect of such variation. As hereinafter shown, the control device may be either an amplifier which also has its control grid potential varied in accordance with the load current or a diode which controls the grid potential of an amplifier interposed between it and the control grid circuit of the regulating device.

The invention will be better understood from the following description considered in connection with the accompanying drawing and its scope is indicated by the appended claims.

Figure 2:
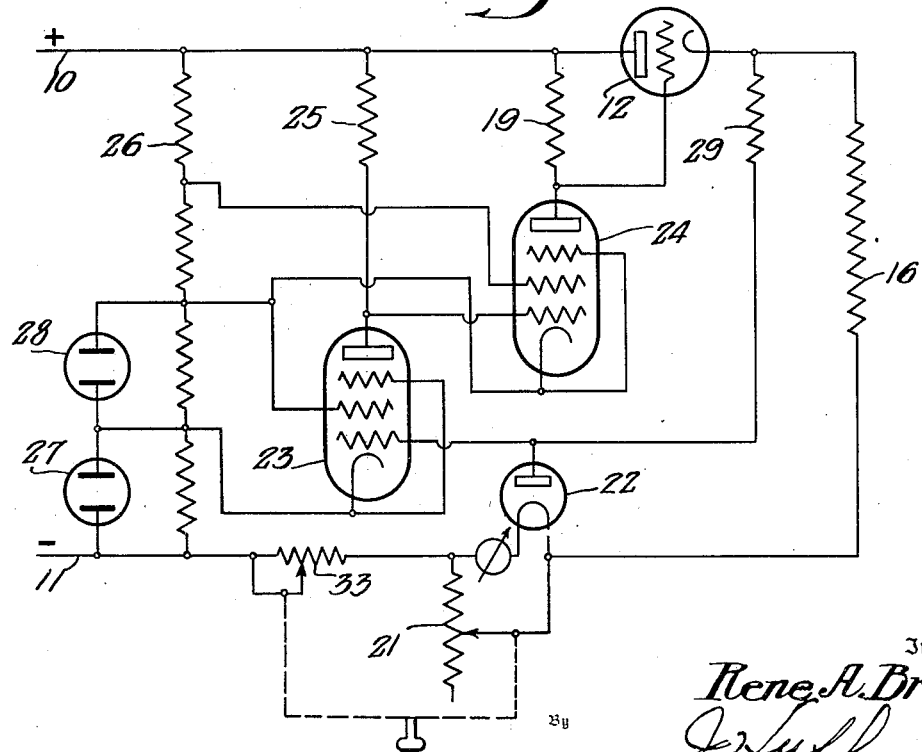

Referring to the drawing,

Figure 1 is a wiring diagram of a regulating system wherein grid control potential is applied to the regulating device through an amplifier comprising one or more electron tubes in cascade and having the cathode heating current and the control grid potential of the first tube (the "control device") both responsive to the load circuit current, and Figure 2 illustrates a similar system wherein grid control potential is applied to the regulating device through a control amplifying channel which has its input potential controlled by a diode having a cathode heating circuit connected in series with the load.

The system of Fig. 1 includes supply terminals 10 and 11 from which current is supplied through the cathode-anode circuit of a regulating device 12, the cathode heating circuit 13 of a control amplifier 14 and a resistor 15 to a load circuit 16. The control amplifier 14 has its screen grid potential applied through a resistor 17 and a glow tube 18, the purpose of which is to keep screen voltage constant, derives its cathode anode potential from the terminals 10 and 11 through a resistor 19 and derives its control grid potential from the resistor 15 through a bias battery 20. It should be noted that the control grid of the regulating device 12 is connected to the junction between the resistor 19 and the anode of the control amplifier 14 and that an adjustable resistor 21 is provided for by-passing any desired part of the load circuit current, around the filament or cathode heater 13 of the control tube 14.

Under these conditions, the control grid potential of the regulating device 12 is dependent on the potential drop of the resistor 19 and this potential drop is determined by the cathode-anode current of the control amplifier 14. The cathode-anode current of the amplifier 14 is of course determined by two factors both of which are dependent on the current of the circuit 16. Thus increase in the load current causes a more positive or less negative control grid voltage to be applied to the amplifier 14 and at the same time increases the electron emission at the cathode of this amplifier. The result is that the cathode-anode current of the amplifier 14 is increased, the potential drop of the resistor 19 is likewise increased, the control grid potential of the device 12 is made more negative and the current of the load device is restored to a value equal to its original value plus a small increment which effects the regulating action; the greater the voltage amplification between the grid of the control tube and the grid of the regulating tube, the smaller the increment will be. Even with a single amplifying tube, as shown in Fig. 1, the increment is only a small fraction of the change that would occur without a regulator if either the load resistance or the applied voltage changed.

The function of the rheostat 21 is to by-pass all of the load current except that required for proper excitation of the filament of 14. After the required load current is gotten by adjustment of the potentiometer 15, the current through the filament may be regulated to its normal value by reference to the ammeter 34. This will cause a slight change in the load current, which can be corrected if desired by a slight readjustment of 15. Since a particular position on potentiometer 15 corresponds quite accurately to a certain current, it is possible to couple the adjustments of 21 and 15 through a suitable mechanical linkage so that the proper filament current is maintained as the load current is varied between wide limits by adjustment of 15.

It is ordinarily desirable that tube 14 be one having a filament-type cathode of small heat capacity, so that it will respond rapidly to changes in load current. However, heater-type cathodes may be used if a delay of several seconds in complete response to a change in the circuit is permissible.

The system of Fig. 2 is similar to that of Fig. 1 in some respects but differs therefrom in that the control amplifier 14 is replaced by a diode 22 which functions to control the input potential of a control channel which includes the amplifiers 23 and 24. The amplifier 23 derives its cathode-anode potential from the terminals 10—11 through a resistor 25 and the lower section of a resistor 26, a glow tube 27 being provided for stabilizing the cathode potential of this amplifier. The amplifier 24 derives its cathode-anode potential from the terminals 10—11 through the resistor 19 and the lower two sections of the resistor 26, an additional glow tube 18 being provided to stabilize the voltage at the cathode of the amplifier 24 and at the screen grid of the amplifier 24. Screen grid potential is applied to the amplifier 24 from a terminal intermediate the two upper sections of the resistor 26.

It will be noted that cathode-anode potential is applied to the diode 22 through a resistor 29 and that the diode filament is connected in series with the load circuit 16.

In the operation of the system of Fig. 2, increase in the load current releases more electrons at cathode of the diode 22, greater current is transmitted through the resistor 29, the control grid of the amplifier is made more negative, less current is transmitted through the resistor 25, the control grid of the amplifier 24 is made more positive, more current is transmitted through the resistor 19, the grid potential of the regulating device 12 is made more negative and the current of the load circuit 16 is restored to its normal value. How this effect is reversed when the load current decreases will be apparent without detailed explanation.

The circuit is caused to stabilize itself at the required load current by adjustment of the screen and plate voltages applied to tubes 23 and 24, adjustment of the magnitudes of resistance 19 and 25, and by regulation of the filament shunt rheostat 21, the latter being adjustable only within limits which will not damage tube 22 or make it inoperative. However, this adjustment may be facilitated by a rheostat 33, which provides a means of adjustment of the voltage between grid and cathode of 23 which is independent of diode 22. This rheostat also adds to the regulating action, but, in practice, this part of its action will be relatively small compared with the effect of the diode.

I claim as my invention:

1. The combination of current supply terminals, a regulating device provided with control grid and cathode-anode circuits, a control device provided with cathode heating and cathode-anode circuits, a load circuit connected to said supply terminals through the cathode-anode circuit of said regulating device and through the cathode heating circuit of said control device, means responsive to variation in the current of said cathode heating circuit for controlling the control grid circuit potential of said regulating device, and means for diverting current from said supply terminals to the cathode-anode circuit of said control device to the exclusion of the load circuit.

2. The combination of current supply terminals, a regulating device provided with control grid and cathode-anode circuits, a control device provided with cathode heating and cathode-anode circuits, a load circuit connected to said supply terminals through the cathode-anode circuit of said regulating device and through the cathode heating circuit of said control device, means responsive to variation in the current of said cathode heating circuit for controlling the control grid circuit potential of said regulating device, and means for diverting a part of the load circuit current from said cathode heating circuit.

3. The combination of current supply terminals, a regulating device provided with control grid and cathode-anode circuits, a control device provided with cathode heating and cathode-anode circuits, a load circuit connected to said supply terminals through the cathode-anode circuit of said regulating device and through the cathode heating circuit of said control device, an amplifier arranged to have its output voltage controlled both in response to variation in the current through said cathode heating circuit and in response to the total load current, means for applying to the control grid circuit of said regulating tube a potential dependent on the output of said amplifier, and means for simultaneously adjusting the proportion of the load circuit current transmitted through said cathode heating circuit and the magnitude of said total load current.

4. The combination of current supply terminals, a regulating device provided with control grid and cathode-anode circuits, a control device provided with control grid, cathode heating and cathode-anode circuits, a load circuit connected to said supply terminals through the cathode-anode circuit of said regulating device and through the cathode heating circuit of said control device, and separate means responsive respectively to variation in the current of said cathode heating circuit and to the total load current for controlling the control grid circuit potential of said regulating device, and means for simultaneously adjusting said separate grid potential control means.

RENE A. BRADEN.